US010368110B1

(12) United States Patent
Verbist et al.

(10) Patent No.: US 10,368,110 B1
(45) Date of Patent: Jul. 30, 2019

(54) SMOOTH MEDIA DATA SWITCHING FOR MEDIA PLAYERS

(71) Applicant: VisualOn, Inc., San Jose, CA (US)

(72) Inventors: Luc August Jozef Maria Verbist, Palo Alto, CA (US); Chin-Yee Lin, Los Gatos, CA (US)

(73) Assignee: VisualOn, Inc., San Jose, CA (US)

( * ) Notice: Subject to any disclaimer, the term of this patent is extended or adjusted under 35 U.S.C. 154(b) by 292 days.

(21) Appl. No.: 14/463,363

(22) Filed: Aug. 19, 2014

Related U.S. Application Data

(60) Provisional application No. 61/868,457, filed on Aug. 21, 2013.

(51) Int. Cl.
| H04N 21/25 | (2011.01) |
| H04N 21/234 | (2011.01) |
| H04N 21/239 | (2011.01) |
| H04N 21/24 | (2011.01) |
| H04N 21/472 | (2011.01) |

(52) U.S. Cl.
CPC ....... *H04N 21/251* (2013.01); *H04N 21/2393* (2013.01); *H04N 21/23406* (2013.01); *H04N 21/2401* (2013.01); *H04N 21/2408* (2013.01); *H04N 21/472* (2013.01)

(58) Field of Classification Search
CPC .... H04L 29/06; H04N 5/445; H04N 21/4884; H04N 21/4396
USPC ................................................ 725/109, 135
See application file for complete search history.

(56) References Cited

U.S. PATENT DOCUMENTS

| 6,985,188 | B1* | 1/2006 | Hurst, Jr. ................. 348/553 |
| 2002/0007493 | A1* | 1/2002 | Butler et al. ............. 725/109 |
| 2003/0069964 | A1* | 4/2003 | Shteyn et al. ............ 709/225 |
| 2004/0255336 | A1* | 12/2004 | Logan et al. ............ 725/135 |
| 2007/0107029 | A1* | 5/2007 | Monroe et al. .......... 725/105 |
| 2008/0046117 | A1* | 2/2008 | Koo et al. ................ 700/236 |
| 2010/0026809 | A1* | 2/2010 | Curry ............... H04N 5/222 348/157 |
| 2010/0066904 | A1* | 3/2010 | Schindler ......... H04N 5/44513 348/468 |
| 2010/0077441 | A1* | 3/2010 | Thomas ............ G06F 3/1415 725/133 |
| 2010/0098389 | A1* | 4/2010 | Shimada .................... 386/52 |
| 2012/0151539 | A1* | 6/2012 | Funge et al. ............. 725/109 |
| 2012/0331106 | A1* | 12/2012 | Ramamurthy et al. ... 709/218 |
| 2013/0046849 | A1* | 2/2013 | Wolf et al. ............... 709/217 |
| 2014/0150042 | A1* | 5/2014 | Pacor ........... H04N 21/21805 725/116 |
| 2014/0189739 | A1* | 7/2014 | Kummer et al. ......... 725/40 |
| 2015/0220620 | A1* | 8/2015 | Arana ............ H04N 21/4627 707/741 |

* cited by examiner

*Primary Examiner* — Rong Le
(74) *Attorney, Agent, or Firm* — Van Pelt, Yi & James LLP

(57) ABSTRACT

A system for smooth media data switching for media players comprises a selection predictor to determine one or more predicted pre-buffer streams in response to an indication of a potential change selection from a user and a stream provider to provide the one or more predicted pre-buffer stream in addition to a current stream.

9 Claims, 6 Drawing Sheets

SMOOTH MEDIA DATA SWITCHING FOR MEDIA PLAYERS

CROSS REFERENCE TO OTHER APPLICATIONS

This application claims priority to U.S. Provisional Patent Application No. 61/868,457 entitled SMOOTH MEDIA DATA SWITCHING FOR MEDIA PLAYERS filed Aug. 21, 2013 which is incorporated herein by reference for all purposes.

BACKGROUND OF THE INVENTION

Many video streams contain selections of different media data, such as audio language, subtitle language, and video angle selections. Typical media players buffer a certain amount of media data at the beginning in order to smooth out the play quality and to reduce the impact of unstable streaming network bandwidth or local disk data reading speed. After media data selection, media players need to flush out old data and buffer new data. Because this process takes time, it causes the video playback to pause while the buffering is finishing. This introduces delay and degrades the playback quality and the viewer experience.

BRIEF DESCRIPTION OF THE DRAWINGS

Various embodiments of the invention are disclosed in the following detailed description and the accompanying drawings.

DETAILED DESCRIPTION

Figure 1:
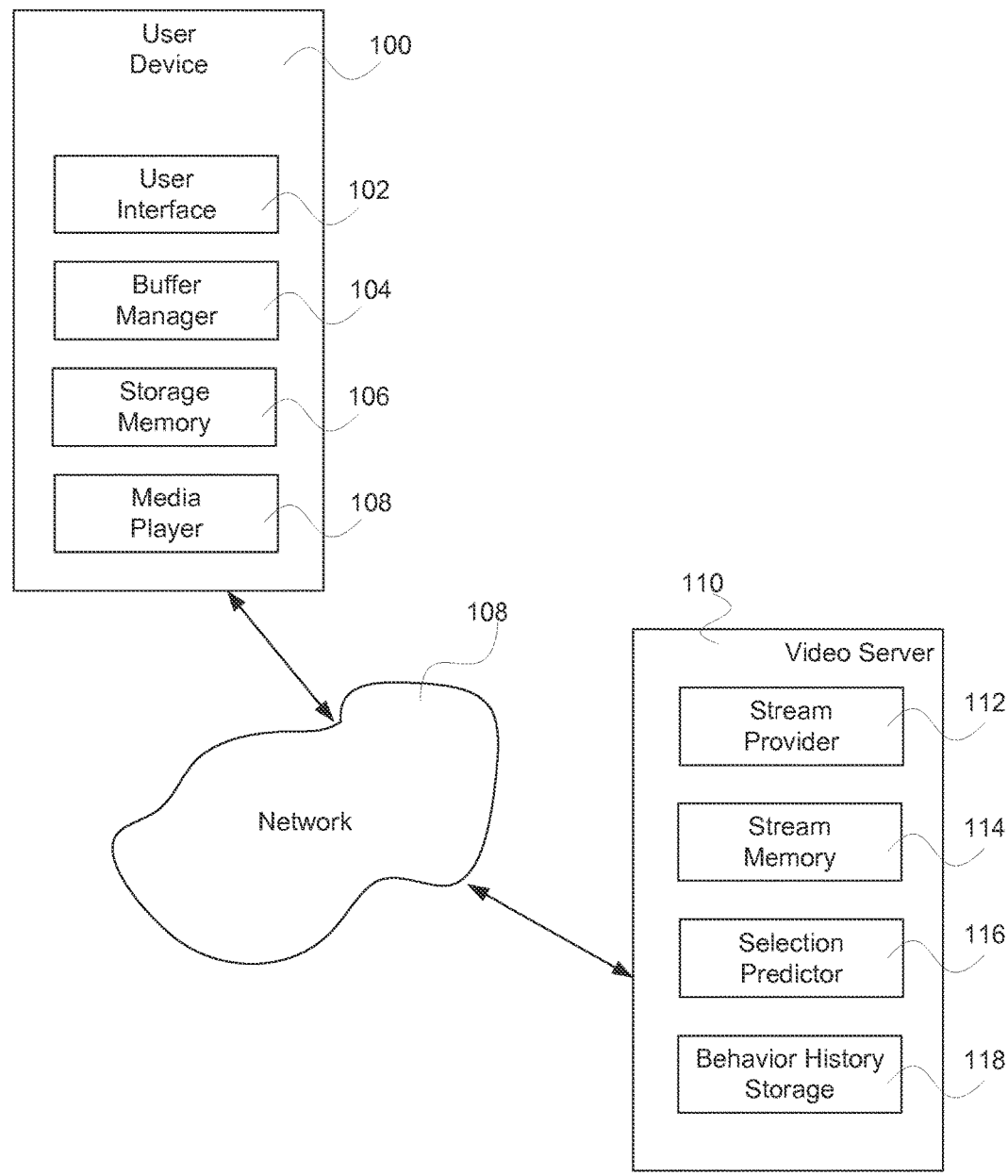
FIG. 1 is a diagram illustrating an embodiment of a system for smooth media data switching for media players.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for smooth media data switching for media players is disclosed. The system comprises a selection predictor to determine one or more predicted pre-buffer streams in response to an indication of a potential change selection from a user and a stream provider to provide the one or more predicted pre-buffer stream in addition to a current stream. In some embodiments, the system comprises a processor configured to execute instructions stored in a memory.

In some embodiments, multiple selections of audios, subtitles, and video angles in a media stream are popular for video vendors as they enable the vendor to serve different groups of viewers with the same stream. These multiple selection capabilities are supported by the popular streaming formats—such as dynamic adaptive streaming over HTTP (DASH) and hypertext transfer protocol (HTTP) Live Streaming, and local file formats such as motion picture experts group format MPEG-4 (MP4) from MPEG or Transport Stream (TS). Media players provide User Interface (UI) for viewers to select their preferred options at any time while media players are playing videos.

In some embodiments, due to the uncertainty of available network bandwidth for streaming and disk data reading speed for local files, media players typically buffer certain data before starting play to make sure they have available data to playback in real time without the impact of incoming data speed fluctuation. However, this causes problems when users change their selection when videos are being played.

For example, typically media players buffer 10 seconds of video and audio at the beginning before starting to playback the video to a user. If a viewer begins a video playback using the default audio/language—for example, English, and then later the viewer uses the UI to switch the audio to French, the media player has to flush out the 10 seconds of buffered English audio data and buffer 10 seconds of French audio data before starting to play video with the selected French audio. Assuming the re-buffering process takes 1 second, the real time video playing will freeze for 1 second to wait for French data buffering. The switch causes delay and results in bad user experience. For example, while live streaming, a 10-second buffering causes a 10-second delay when a switch is called for.

In some embodiments, in order to improve the situation, a system for viewer behavior prediction and data pre-buffering is disclosed.

In some embodiments, a user interface indication is received indicating that the user is viewing a user interface for changing a media player parameter and the system determines a top N likely potential changes and begins providing pre-buffering data streams corresponding the top N likely potential changes. In some embodiments, a user interface indication is received indicating that the user has selected a change for a media player parameter (e.g., an audio selection, a video selection, a viewing angle selection, a subtitle selection, etc.) and the system determines that the change corresponds to a pre-buffering stream and continues to provide the pre-buffering stream and terminates other streams. In some embodiments, a user interface indication is received indicating that the user has selected a change for a media player parameter (e.g., an audio selection, a video selection, a viewing angle selection, a subtitle selection, etc.) and the system determines that the change does not correspond to a pre-buffering stream and the system provides a stream corresponding the selected change and terminates other streams. In some embodiments, a current stream is continued to be provided in order to have a smooth transition to a selected change to a media player.

In some embodiments, the indication received from a user system is indicating that a user has requested viewing of an interface that does not directly indicate that a change is desired to a media player operating parameter, but rather that may be used to access one or more other interfaces to ultimately access and interface that enables a user to make a change selection to a media player operating parameter (e.g., a change to video, audio, subtitles, view angle, etc.).

In some embodiments, the top N likely potential changes are based on the indication of a user requesting an interface that does not directly enable a user to make a system change (e.g., does not enable the determination of the type of change likely to be selected). For example, a top N predicted changes are of more than one type of possible change (e.g., a change of audio and a change of subtitle, a change of video angle and a change of bandwidth, etc.). In some embodiments, the number of predicted changes selected is based at least in part on the bandwidth available. For example, in the event that there is more bandwidth available more likely potential change streams are provided and in the event that there is less bandwidth available less likely potential change streams are provided. In some embodiments, bandwidth thresholds are set to determine bins associated with different numbers of streams that are to be provided to a user device from a server.

In some embodiments, from the moment a viewer invokes an audio selection UI (e.g., prior to any selection by a viewer), the system predicts that the viewer will select a different audio and starts to pre-buffer all available audio data that could be selected (e.g., French and Spanish) for the full buffer time (e.g., the 10 seconds). When the viewer finishes making a selection (e.g., for the French audio stream) and confirms it within the UI, typically taking several seconds, all or part of the data buffering has already been completed. The media player can simply throw away the current buffer and any buffers not selected (e.g., English and Spanish audio), and begin playing the videos with selected audio (e.g., the French audio track) with little or no wait time.

Although pre-buffering increases buffer memory and bandwidth requirement, the buffers are small (e.g., only a short period of media data). Also, the memory can be freed up as soon as the switch is finished. In some embodiments, viewer behavior prediction is used to decide the priority of data to pre-buffer. For example, if users have a history of watching more video in French, the system buffers French first and then perhaps Spanish because it is a second most popular language. In various embodiments, viewer behavior prediction is based at least in part on one or more of the following: the UI action correlation, viewers' preference settings, viewing history, or any other appropriate factor.

In various embodiments, a UI action correlation comprises:

- Once viewers bring up selection UI of audio, video or subtitle, it is predicted that audio, video or subtitle will be changed, respectively; so, pre-buffering of the appropriate streams is started
- Once viewers adjust sound volume UI to zero, it is predicted that subtitles will be turned on; so, pre-buffering of subtitle data is started
- Once viewers zoom in on a particular video area on the screen, it is predicted that a related video angle will be selected; so, pre-buffering of video angle streams is started In some embodiments, for preference settings, media players can provide viewers the settings, such as preferred audios, videos and subtitles. For example, if viewers set French as preferred language, media players can pre-buffer French data before pre-buffering other audio/subtitle data to minimize the freezing time if French audio/subtitles is selected and available bandwidth is very low.

In some embodiments, similar prediction can be done based on the viewing history of viewers. The viewing history is the recording of viewers' previous viewing experience, such as language selection. The history can be stored in local storage or servers. Media players can retrieve the history when viewers start the players and pre-buffer last or most often used selections when appropriate.

FIG. 1 is a diagram illustrating an embodiment of a system for smooth media data switching for media players. In the example shown, a user device 100 comprises user interface 102, buffer manager 104, and storage memory 106. User interface 102 is used by a user to change a media player parameter of media player 108. Buffer manager 104 manages streams received from a server. Storage memory 106 stores streams received from a server and provides them for display to a user via user interface 102. User device 100 communicates with video server 110 via network 108. In various embodiments, network 108 comprises a wired network, a wireless network, the internet, a combination of networks, a cellular network, or any other appropriate network. Video server 110 comprises stream provider 112, stream memory 114, selection predictor 116, and behavior history storage 118. Stream provider 112 provides streams to user device 100. Stream memory 114 stores streams or base data from which streams are determined. Selection predictor 116 determines a prediction of a selection of a user. For example, a top N prediction of a selection of a user based on an indication of a selection of an interface by a user. In some embodiments, the prediction is based at least in part on a behavior history (e.g., a behavior history as stored in behavior history storage 118). In some embodiments, behavior history storage 118 stores a history of user selections for each user interface of a media player (e.g., an audio language stream selection for an audio language stream user interface, a subtitle selection for a subtitle user interface, a video angle selection for a video angle user interface, a selection of a type—for example, audio type, subtitle type, video angle type—upon invoking of a user interface of a media player, etc.).

Figure 2:
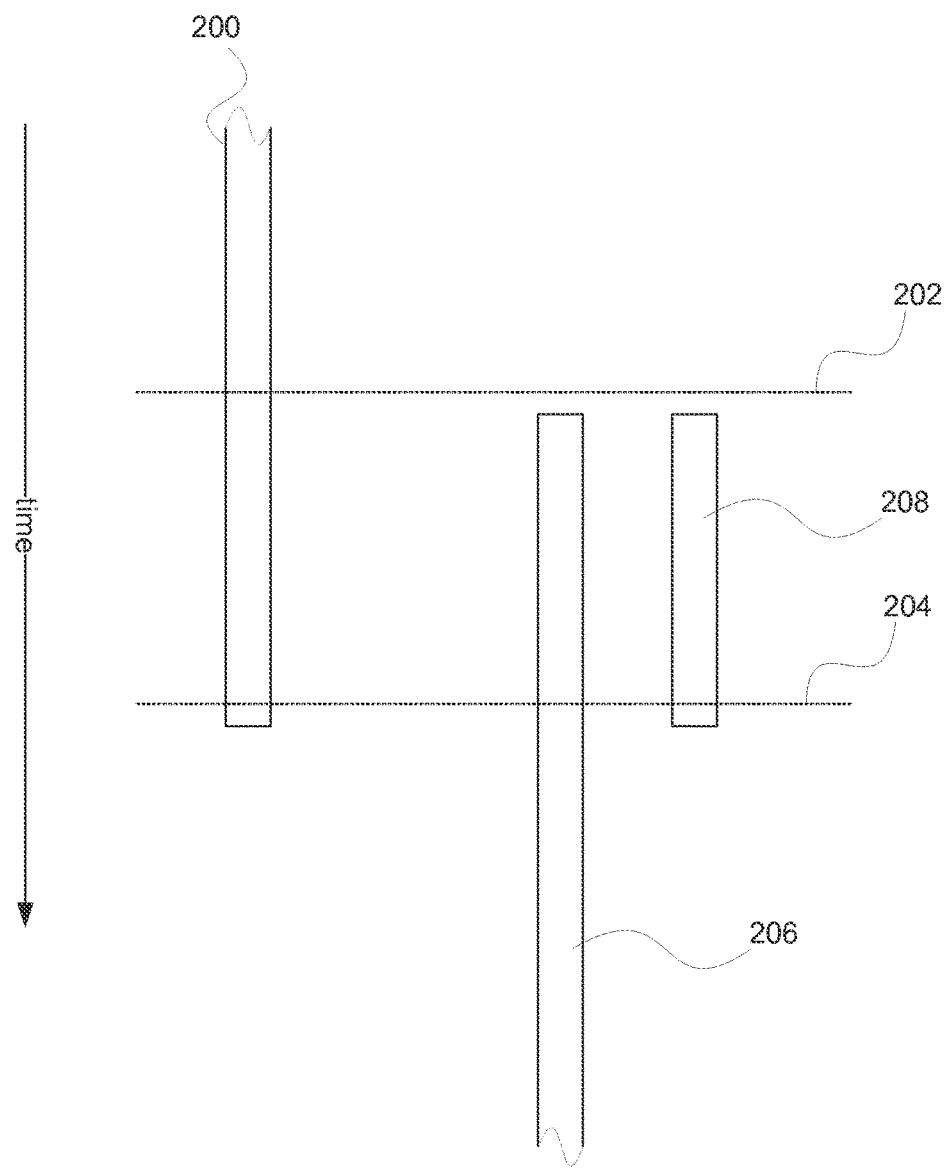
FIG. 2 is a diagram illustrating an embodiment of received streams for pre-buffering.

FIG. 2 is a diagram illustrating an embodiment of received streams for pre-buffering. In the example shown, stream 200 comprises a current stream (e.g., input data for a media player—for example, video data, audio data, subtitle data, etc.). Indication 202 comprises an indication from a user system indicating that a user has selected a user interface that may ultimately allow the user to make a change to a setting (e.g., allow access to a user interface that directly or indirectly, via one or more other user interfaces, enables a user to make a change). The system for smooth media data switching for media players predicts one or more streams that may be selected. These one or more streams (e.g., stream 206 and stream 208) are provided by a video server to a user device for pre-buffering. Indication 204 comprises an indication from a user system indicating that the user has selected a change via a user interface to a setting. It is determined that stream 206 is associated with the selected change. Stream 200, a current display stream, is terminated based on stream 206 being ready to display and being associated with the selected change. Stream 208, a predicted stream provided to a user system, is terminated based on stream 208 not being associated with the selected change.

Figure 3:
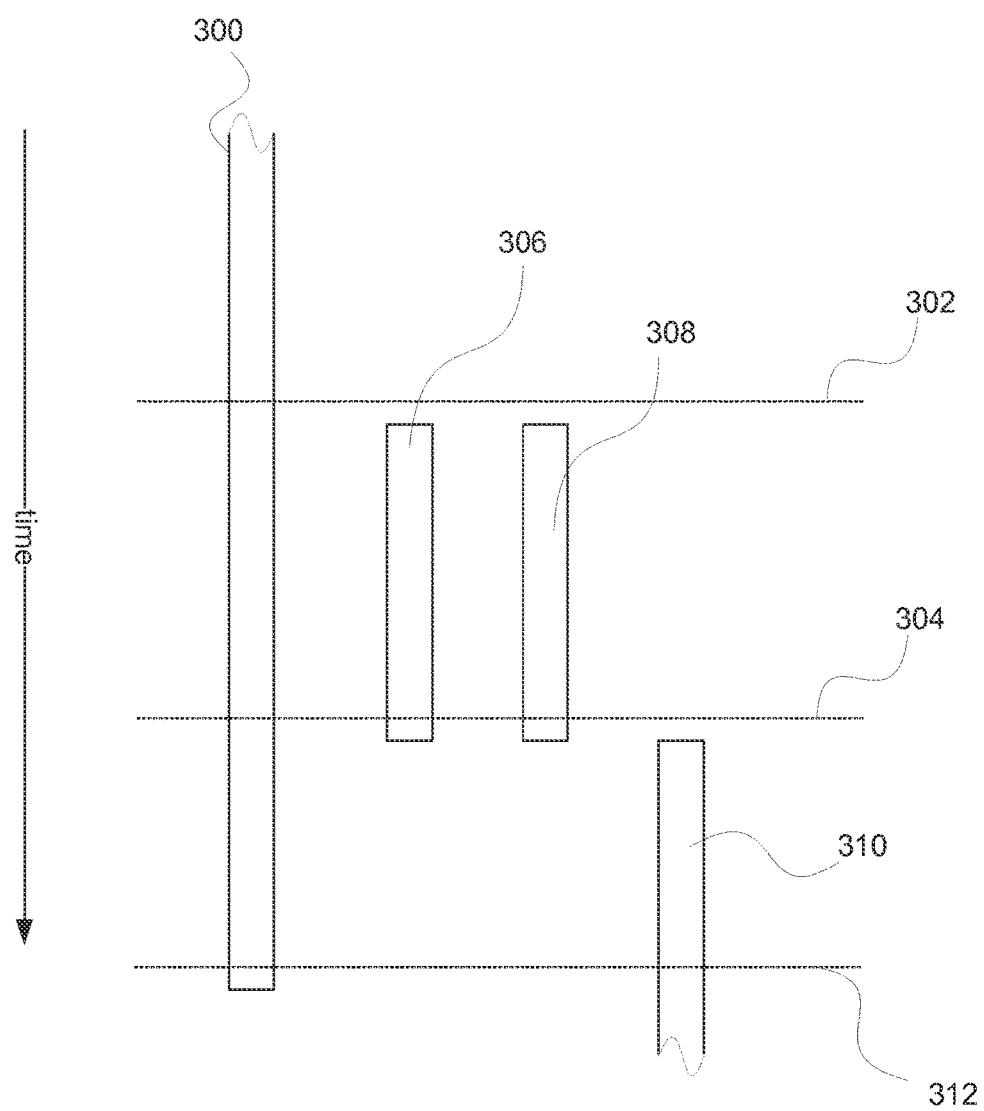
FIG. 3 is a diagram illustrating an embodiment of received streams for pre-buffering.

FIG. 3 is a diagram illustrating an embodiment of received streams for pre-buffering. In the example shown, stream 300 comprises a current stream (e.g., input data for a media player—for example, video data, audio data, subtitle data, etc.). Indication 302 comprises an indication from a user system indicating that a user has selected a user interface that may ultimately allow the user to make a change to a setting (e.g., allow access to a user interface that directly or indirectly, via one or more other user interfaces, enables a user to make a change). The system for smooth media data switching for media players predicts one or more streams that may be selected. These one or more streams (e.g., stream 306 and stream 308) are provided by a video server to a user device for pre-buffering. Indication 304 comprises an indication from a user system indicating that the user has selected a change via a user interface to a setting. It is determined that stream 310 is associated with the selected change. Stream 300, a current display stream, is not terminated based on stream 310 not being ready to display and being associated with the selected change. Stream 306 and stream 308, predicted streams provided to a user system, are terminated based on stream 306 and stream 308 not being associated with the selected change. Stream 310 is provided by a video server to a user device for pre-buffering. Indication 312 comprises an indication from a user system indicating that buffering is complete or that the user system is ready to display a new stream (e.g., stream 310). Stream 300, a current display stream, is terminated based on stream 310 being ready to display and being associated with the selected change.

In some embodiments, stream 300 is terminated and stream 310 is provided to the user system after receiving indication 304 indicating the selected change.

Figure 4:
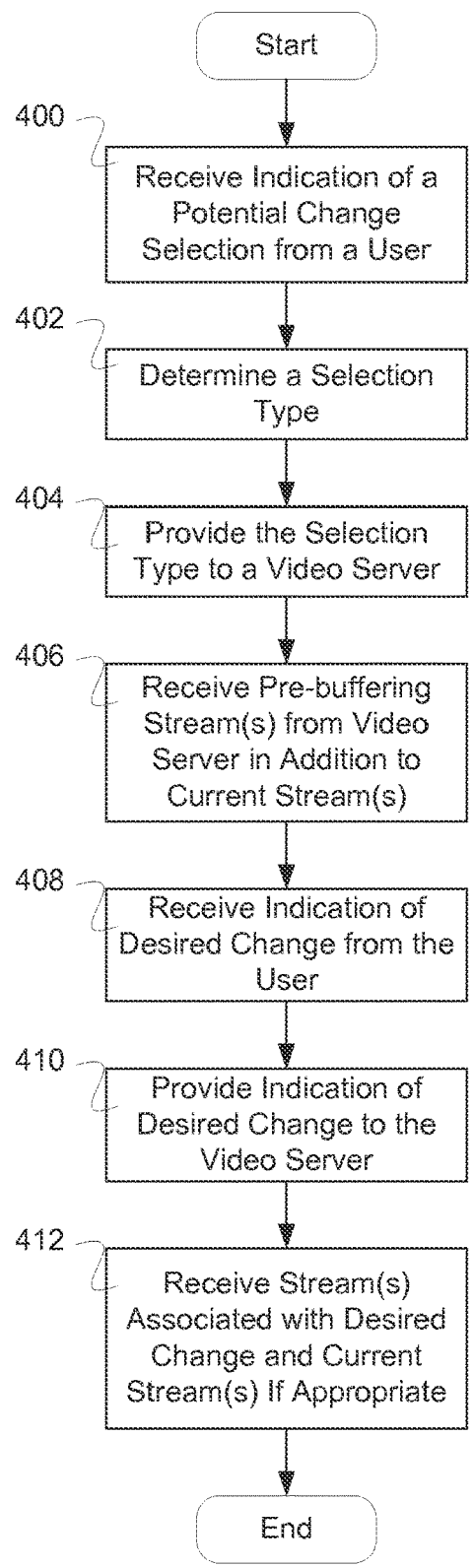
FIG. 4 is a flow diagram illustrating an embodiment of a process for smooth media data switching for media players.

FIG. 4 is a flow diagram illustrating an embodiment of a process for smooth media data switching for media players. In the example shown, in 400 an indication is received of a potential change selection from a user. For example, a user system provides an indication to a video server that a user has selected a user interface that directly or indirectly enables a user to make a change. In some embodiments, the indication is derived from a selection of an interface that indicates the type of change, but not the specific change selected (e.g., audio stream selector, subtitle selector, view angle selector, bit rate selector, etc.). In some embodiments, a video server is provided with an indication that a desire to change a selection is received from a user. In some embodiments, the user device provides a video server an indication that a user interface is accessed that enables either direct or indirect selection of a desired change. In 402, a selection type is determined. For example, the type is determined for a predicted change (e.g., audio, subtitles, video angle, other, etc.). In some embodiments, the type is used to help determine a predicted change. In some embodiments, a type is not received and the predicted change is not based on a type. In 404, the selection type is provided to the video server. For example, the user system provides an indication of selection type to a video server. In some embodiments, no type is provided to a video server. In 406, pre-buffering stream(s) is/are received from video server in addition to current stream(s). For example, the video server predicts additional likely streams to be selected by the user and provides them to the user system to pre-buffer so that the likely selections can be displayed or played with little or no delay to the user. In 408, an indication is received of the desired change from the user. For example, the user system receives a desired change from the user. In 410, an indication is provided of the desired change to the video server. For example, the user system provides a desired change to the video server. In 412, stream(s) associated with desired change and current stream(s), if appropriate, is/are received.

Figure 5:
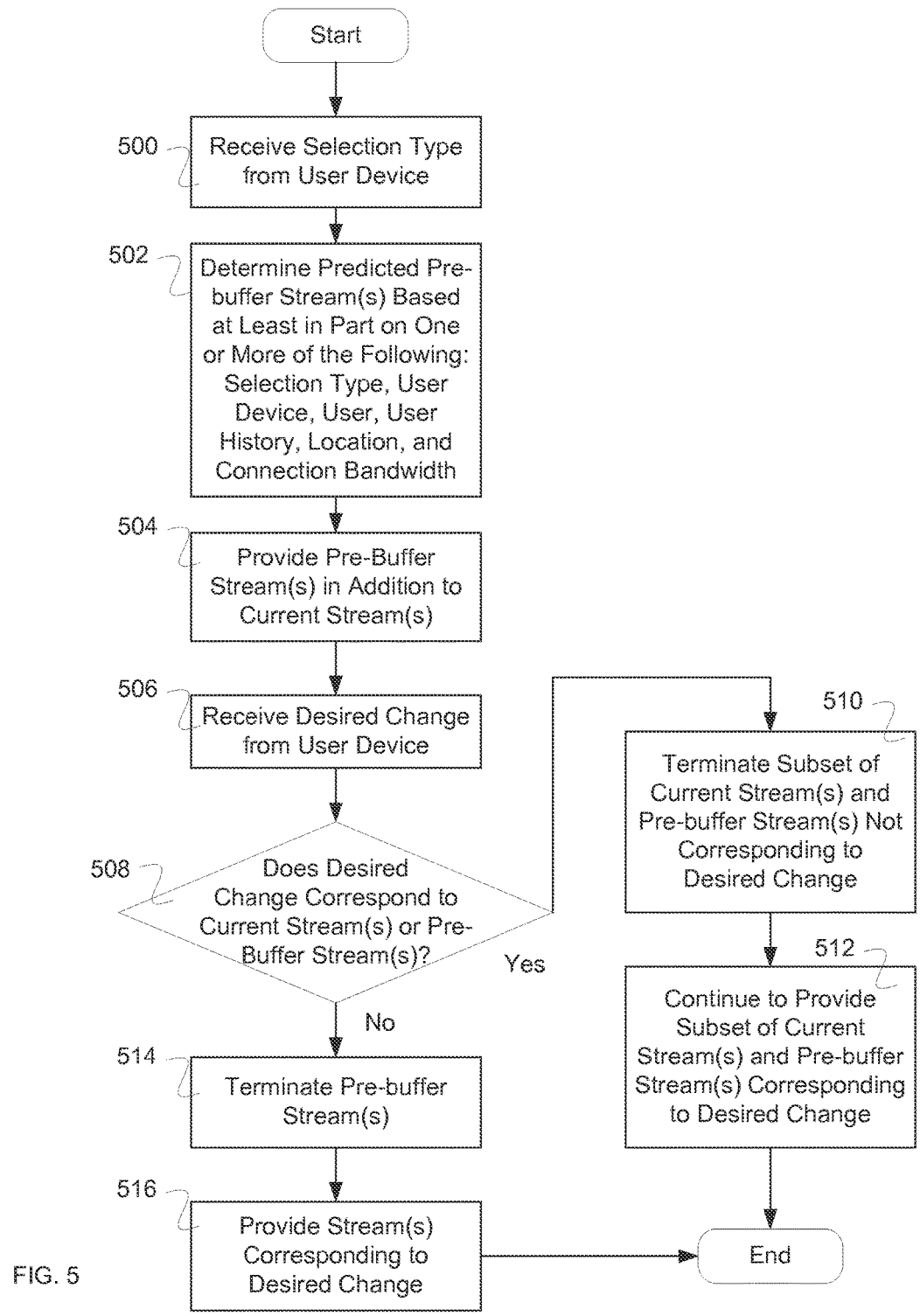
FIG. 5 is a flow diagram illustrating an embodiment of a process for smooth media data switching for media players.

FIG. 5 is a flow diagram illustrating an embodiment of a process for smooth media data switching for media players. In the example shown, in 500 a selection of a type is received from a user device. For example, the selection type is received at the video server from a user device. In some embodiments, no type is received from a user device. In 502, predicted pre-buffer stream(s) is/are determined based at least in part on one or more of the following: selection type, user device, user, user history, location, and/or connection bandwidth. For example, the video server predicts streams to send to a user system to make media data switching smooth by sending streams likely to be selected by a user in changing a media player operation. In some embodiments, a number of streams to provide is determined based at least in part on communication bandwidth between the server and the user device. For example, a number of streams is determined based on the bandwidth being between a first value and a second value. In 504, pre-buffer stream(s) is/are provided in addition to current stream(s). For example, In 506, a desired change is received from a user device. In 508, it is determined whether a desired change corresponds to current stream(s) or pre-buffer stream(s). In the event that the desired change corresponds to current stream(s) or pre-buffer stream(s), in 510 a subset of current stream(s) and pre-buffer stream(s) is/are terminated and in 512 a subset of current stream(s) and pre-buffer stream(s) corresponding to desired change continue to be provided. For example, a user experiences a smooth switching experience in response to a selected change because the appropriate streams are available having been pre-buffered to a media player on a user device. The streams can be switched to without noticeable delay. In the event that the desired change does not correspond to current stream(s) or pre-buffer stream(s), in 514 pre-buffer stream(s) is/are terminated and in 516 stream(s) corresponding to desired change are provided. For example, a user experiences a delayed switching experience in response to a selected change because the appropriate streams are not available having predicted incorrectly which streams to pre-buffer to a media player on a user device.

Figure 6:
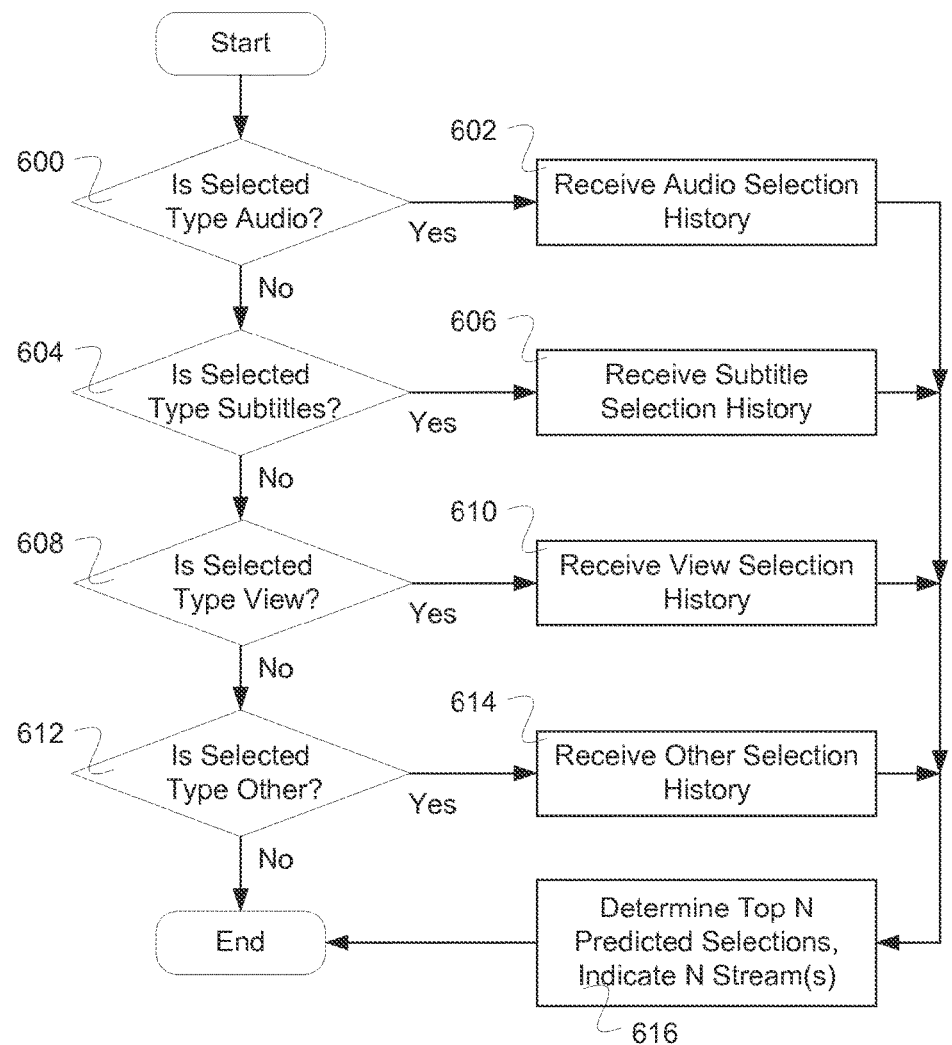
FIG. 6 is a flow diagram illustrating an embodiment of a process for determining predicted selections.

FIG. 6 is a flow diagram illustrating an embodiment of a process for determining predicted selections. In some embodiments, the process of FIG. 6 is used to implement 502 of FIG. 5. In the example shown, in 600 it is determined whether audio is the selected type. In the event that the selected type is audio, in 602 the audio selection history is received and control passes to 616. In the event that the selected type is not audio, control passes to 604. In 604, it is determined whether subtitles is the selected type. In the event that the selected type is subtitles, in 606 the subtitle selection history is received and control passes to 616. In the event that the selected type is not subtitles, control passes to 608. In 608, it is determined whether view is the selected type. In the event that the selected type is view, in 610 the view selection history is received and control passes to 616. In the event that the selected type is not view, control passes to 612. In 612, it is determined whether other is the selected type. In the event that the selected type is other, in 614 the other selection history is received and control passes to 616. In the event that the selected type is not other, the process ends. In 616, a top N predicted selections are determined and N stream(s) are indicated.

In some embodiments, the N streams indicated are based on the selection history. In some embodiments, the number N is based at least in part on the available bandwidth between the user system and the video server. For example, below a first bandwidth value, no pre-buffer streams are provided; between a first bandwidth value and a second bandwidth value 1 pre-buffer stream is provided, between a second bandwidth value and a third bandwidth value 2 pre-buffer streams are provided, between a third bandwidth value and a fourth bandwidth value 3 pre-buffer streams are provided, etc.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for smooth media data switching, comprising:
an interface to:
  receive a potential change indication from a user of a potential change to a media player parameter of a current video stream the user is watching, wherein the potential change indication comprises zooming in on a particular video area of the current video stream, wherein the media player parameter comprises a viewing angle selection type; and
  receive a change indication from the user to change the media player parameter of the current video stream; and
a processor to:
  determine a plurality of predicted pre-buffer streams in response to the potential change indication from the user, wherein a plurality of viewing angle streams are related to the particular video area of the current video stream zoomed in on, wherein the plurality of predicted pre-buffer streams corresponds to a top N predicted potential changes to the media player parameter;
  provide the plurality of predicted pre-buffer streams in addition to the current video stream to a user device associated with the user, wherein the plurality of predicted pre-buffer streams are provided to the user device for pre-buffering, wherein providing the plurality of predicted pre-buffer streams begins after the potential change indication from the user, wherein the plurality of predicted pre-buffer streams comprises a plurality of viewing angle streams; and
  in response to the change indication to change the media player parameter, determine whether the change to the media player parameter of the current video stream corresponds to one of the plurality of predicted pre-buffer streams.

2. A system as in claim 1, wherein determining the plurality of predicted pre-buffer streams is based at least in part on one or more of: the user device, the user, a user history, a location, and a connection bandwidth.

3. A system as in claim 1, wherein in response to the change to the media player parameter of the current video stream corresponding to one of the plurality of predicted pre-buffer streams, the processor terminates providing the current video stream.

4. A system as in claim 1, wherein in response to the change to the media player parameter of the current video stream not corresponding to one of the plurality of predicted pre-buffer streams, the processor provides a stream corresponding to the change.

5. A system as in claim 1, wherein in response to the change to the media player parameter of the current video stream not corresponding to one of the plurality of predicted pre-buffer streams, the processor terminates providing the plurality of predicted pre-buffer streams.

6. A system as in claim 1, wherein the top N predicted potential changes to a media player parameter are based at least in part on a selection history.

7. A system as in claim 1, wherein N is based at least in part on a connection bandwidth.

8. A method of smooth media data switching, comprising:
  receiving a potential change indication from a user of a potential change to a media player parameter of a current video stream the user is watching, wherein the potential change indication comprises zooming in on a particular video area of the current video stream, wherein the media player parameter comprises a viewing angle selection type;
  receiving a change indication from the user to change the media player parameter of the current video stream;
  determining, using a processor, a plurality of predicted pre-buffer streams in response to the potential change indication from a user, wherein a plurality of viewing angle streams are related to the particular video area of the current video stream zoomed in on, wherein the plurality of predicted pre-buffer streams corresponds to a top N predicted potential changes to a media player parameter;
  providing the plurality of predicted pre-buffer streams in addition to the current video stream to a user device associated with the user, wherein the plurality of predicted pre-buffer streams are provided to the user device for pre-buffering, wherein providing the plurality of predicted pre-buffer streams begins after the potential change indication from the user, wherein the plurality of predicted pre-buffer streams comprises a plurality of viewing angle streams; and
  in response to the change indication to change the media player parameter, determining whether the change to the media player parameter of the current video stream corresponds to one of the plurality of predicted pre-buffer streams.

9. A computer program product for smooth media data switching, the computer program product being embodied in a tangible non-transitory computer readable storage medium and comprising computer instructions for:
  receiving a potential change indication from a user of a potential change to a media player parameter of a current video stream the user is watching, wherein the potential change indication comprises zooming in on a particular video area of the current video stream, wherein the media player parameter comprises a viewing angle selection selection type;
  receiving a change indication from the user to change the media player parameter of the current video stream;
  determining a plurality of predicted pre-buffer streams in response to the potential change indication from a user, wherein a plurality of viewing angle streams are related to the particular video area of the current video stream zoomed in on, wherein the plurality of predicted pre-buffer streams corresponds to a top N predicted potential changes to the media player and parameter;

providing the plurality of predicted pre-buffer streams in addition to the current video stream to a user device associated with the user, wherein the plurality of predicted pre-buffer streams are provided to the user device for pre-buffering, wherein providing the plurality of predicted pre-buffer streams begins after the potential change indication from the user, wherein the plurality of predicted pre-buffer streams comprises a plurality of viewing angle streams; and in response to the change indication to change the media player parameter, determining whether the change to the media player parameter of the current video stream corresponds to one of the plurality of predicted pre-buffer streams.

* * * * *